(No Model.) 2 Sheets—Sheet 1.
W. W. ROSENFIELD.
METHOD OF AND APPARATUS FOR MAKING LEAD PIPE S-TRAPS.
No. 454,186. Patented June 16, 1891.
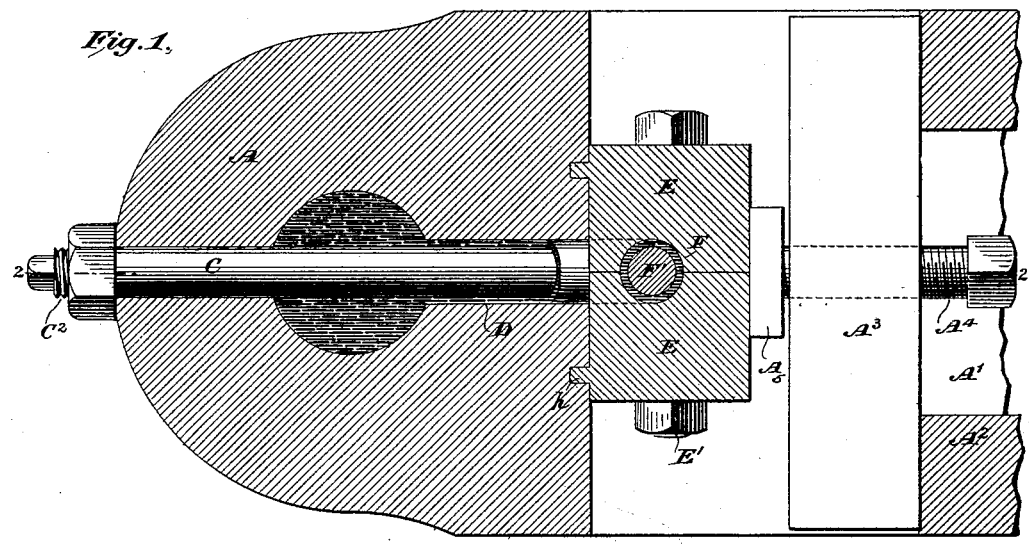
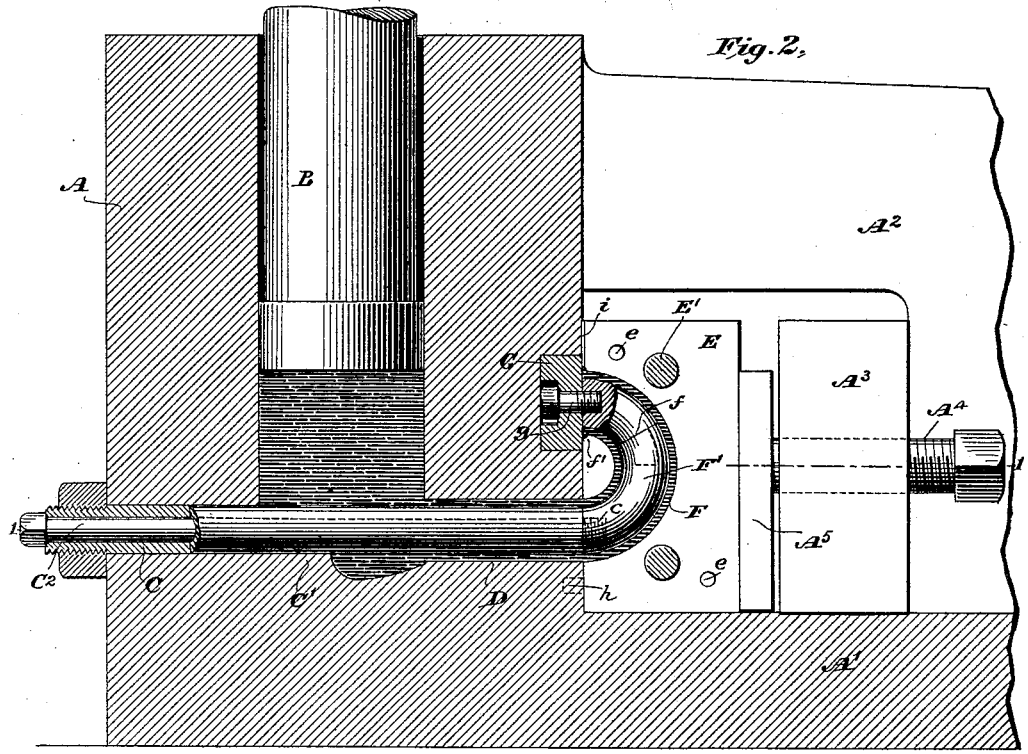
Witnesses
Geo. W. Breck.
Henry W. Lloyd.
Inventor
William W. Rosenfield
By his Attorneys
Baldwin, Davidson, & Wight (No Model.) 2 Sheets—Sheet 2.
W. W. ROSENFIELD.
METHOD OF AND APPARATUS FOR MAKING LEAD PIPE S-TRAPS.
No. 454,186. Patented June 16, 1891.
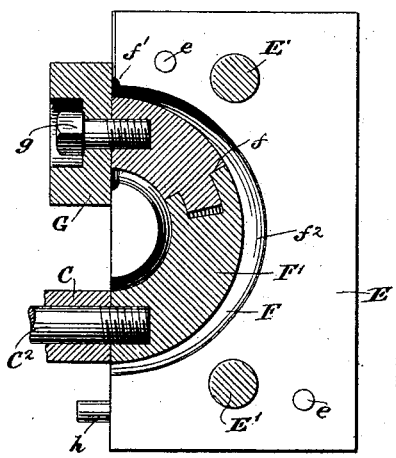
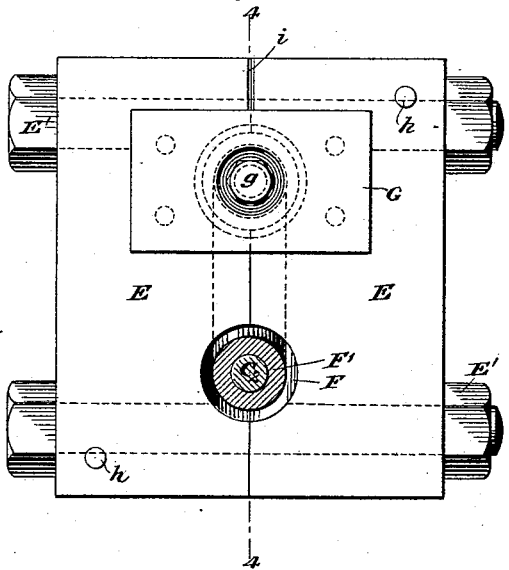
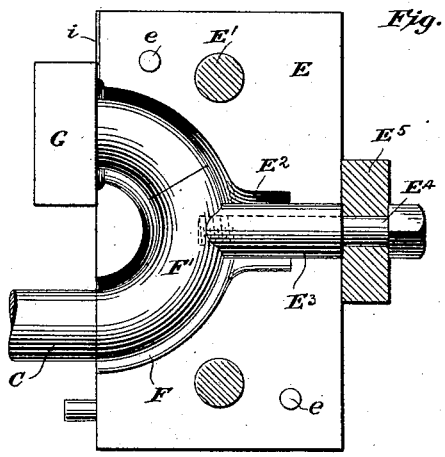
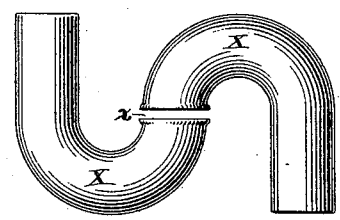
Witnesses
Geo. W. Breck.
Henry W. Lloyd.
Inventor
William W. Rosenfield
By his Attorneys
Baldwin, Davidson & Wight

UNITED STATES PATENT OFFICE.

WILLIAM W. ROSENFIELD, OF NEW YORK, N. Y., ASSIGNOR OF ONE-THIRD TO MYRE H. FRANK, OF SAME PLACE.

METHOD OF AND APPARATUS FOR MAKING LEAD-PIPE S-TRAPS.

SPECIFICATION forming part of Letters Patent No. 454,186, dated June 16, 1891.

Application filed March 19, 1890. Renewed November 22, 1890. Serial No. 372,291. (No model.)

*To all whom it may concern:*

Be it known that I, WILLIAM W. ROSENFIELD, a citizen of the United States, residing at New York, in the county and State of New York, have invented certain new and useful Improvements in the Method of and Apparatus for Making Lead-Pipe S-Traps, of which the following is a specification.

Heretofore such traps have been made by a somewhat difficult process of bending a straight section of pipe or by casting or in a lead-pipe machine having a peculiar arrangement for supplying the lead from opposite sides in varying quantities or under varying pressure, whereby the lead as it emerges from the die of the press is caused to assume, by reason of the unequal pressure of lead on opposite sides, the desired bent or sinuous form.

In my invention the lead pipe emerging from the press is directed into a mold around a core having the desired curve, and the pressure upon the lead causes it to assume the desired form. In this way I form one half of an S-trap, two of such halves being subsequently soldered or welded together to form the complete trap.

In the accompanying drawings, Figure 1 is a horizontal section on the line 1 1 of Fig. 2 through a machine and apparatus for carrying out my invention; Fig. 2, a vertical section of the same on the line 2 2 of Fig. 1; Fig. 3, an elevation of the mold-block; Fig. 4, a section through the same on the line 4 4 of Fig. 3; Fig. 5, a similar section showing a modified construction. Fig. 6 shows two half-traps ready to be soldered or welded together electrically or otherwise, and Fig. 7 is a view of a completed trap.

A is the cylinder, and B the plunger, of a lead-press. The cylinder is bored from the back for the insertion of a hollow mandrel or core-bar C. In order to support this bar against the direct pressure of the lead it lies upon a raised bed C' in the bottom of the cylinder. The lead-pipe die in which the pipe is formed around the core-bar is shown in this instance as formed by the opening D, bored through the front wall of the cylinder. With an organization of this kind straight lead pipe may be formed. In order, however, to give it the curve or half-circle turn required in the formation of S-traps I force it into a curved mold and around a curved core held therein. This mold may be composed of two blocks E E, bolted together by two through-bolts E'. Dowel-pins $e$ on one block enter corresponding sockets on the other. In each block there is formed the longitudinal half of the mold, curved to form a half-circle. Within this curved mold, which is of circular cross-section, as shown, a correspondingly-curved core F' is supported in the following manner: A rod $C^2$, passing through the hollow mandrel C, screws into the end of the core-bar at $c$ and holds it up firmly against the end of the mandrel. The upper end of the core is similarly supported by a screw $g$, passing through the rear face of a block G, which, when the mold is in position, is seated in a recess in the face of the lead-cylinder, as clearly shown in Fig. 2. Dowels $h$ on the mold-block are similarly seated in corresponding sockets in the face of the lead-cylinder. A small passage-way or outlet $i$ in the face of the mold-block lying against the cylinder extends from the mold to the top of the block, and when the mold is full and formation of the lead therein completed the squirt or flow of lead from this outlet indicates the fact. A bed-plate A' extends from the front of the base of the lead-cylinder and is connected at each side with the cylinder by a yoke or arch $A^2$. A removable block or beam $A^3$ lies upon the bed-plate across the opening between the two yokes $A^2$, and through it a screw-bolt $A^4$ passes. Between the end of the bolt and the mold-block a plate $A^5$ is interposed.

By this structure, which is merely illustrated as one way of practicing my invention, I am enabled to accomplish the following operation: The mold-block being held up against the lead-cylinder, as shown in Figs. 1 and 2, the lead pipe issuing therefrom enters the mold F around the core F', and is by the pressure compelled to assume the shape of the mold. The squirt or ribbon of lead that will then emerge from the opening $i$ indicates the completion of this operation. The bolt $A^4$ is then retracted and the plate $A^5$ removed. The press being again started, the mold-block is by the pressure of lead forced away from the cylinder and a straight section of the pipe of the desired length formed. This is then cut off, the rod $C^2$ withdrawn from the core F', and the mold-block removed, opened, and the curved half-trap X taken out. In order to facilitate the extraction of the core F' from the curved lead pipe it is made in sections, as indicated at $f$, one section having a dowel seated in a corresponding socket in the other section. As shown at $f'$, the upper end of the mold is formed with an annular enlargement to produce the flange $x$ on the end of the half-trap.

It is sometimes desirable that the wall forming the bottom of the trap proper, or that part which holds the fluid seal, should be thicker than the other parts of the trap. To accomplish this I may form the mold F deeper at the point marked $f^2$ in Fig. 4. The pressure upon the lead being sufficient to cause it to flow and fill every part of the mold, the thicker part of the pipe occupying the part $f^2$ of the mold will be perfectly solid and homogeneous. In Fig. 6 I have shown two half-traps X formed in the manner above described. They may be welded together at their flanged ends $x$, the completed trap being illustrated in Fig. 7.

Sometimes it is desired to form a hub or lateral extension on the outer curved wall of one or both half-traps, as shown in Fig. 7. One of these hubs Y serves for the reception of a removable plug to permit the removal of sediment from the trap, and the other Y' serves for the attachment of a valve or ventilating-pipe. This may be done in the mold by forming the block E with the laterally-extending mold $E^2$, Fig. 5, the core of which is formed by a sleeve $E^3$ extending through the mold-blocks and bearing upon the core F', the sleeve being held rigidly by a bolt $E^4$, passing through a block $E^5$, (lying against the front of the mold-block,) through the sleeve, and screwing into the core F'.

So far as I am aware I am the first to suggest the method of operation consisting in forming hollow curved pipes or traps by forcing a tube of lead or like metal capable of being flowed under pressure into a curved mold around a correspondingly curved core, and the advantage attending the manufacture of traps in this manner is that the metal is perfectly solid and homogeneous, and flaws or imperfections, such as are liable to occur in castings, are avoided, and I am at the same time able to produce the traps readily and economically.

I claim as my invention—

1. The hereinbefore-described method of manufacturing curved, hollow, or tubular bodies, which consists in first forming a tube of the material, and then forcing such tube under pressure into a curved mold around a correspondingly-curved core.

2. The combination of a press adapted to form pipe from lead, &c., of a curved mold having a curved core, into which mold the pipe is forced by the press, and means for holding the mold in position during this operation and releasing it, substantially as set forth.

3. The combination of the mold-blocks having the mold F formed therein, the curved core arranged in said mold, the lead-cylinder and plunger, the hollow mandrel around which the lead pipe is formed, a rod extending through the hollow mandrel and supporting one end of the core F', and means for supporting the opposite end of the core, substantially as set forth.

4. The combination, with the mold-blocks having the mold formed therein and made deeper at $f^2$, of the curved core arranged in the mold, the lead-press, and means for holding the mold in position, whereby the lead pipe as it emerges from the press is forced into the curved mold around the curved core, substantially as set forth.

5. The combination of the mold-blocks, the curved mold formed therein, the sectional curved core, the lead-cylinder, the hollow mandrel and rod $C^2$, supporting one end of the core, the block G and bolt $g'$, supporting the opposite end of the core, and means for holding the mold in position to receive the lead pipe issuing from the press, substantially as set forth.

In testimony whereof I have hereunto subscribed my name.

WM. W. ROSENFIELD.

Witnesses:
 EDWARD C. DAVIDSON,
 MAMIE J. KELLEY.